United States Patent [19]

Tadauchi et al.

[11] 4,367,457

[45] Jan. 4, 1983

[54] SIGNAL PROCESSING APPARATUS

[75] Inventors: Masaharu Tadauchi; Kenji Kumasaka, both of Hitachi, Japan

[73] Assignee: Hitachi, Ltd., Tokyo, Japan

[21] Appl. No.: 260,122

[22] Filed: May 4, 1981

[30] Foreign Application Priority Data

May 9, 1980 [JP] Japan ................................. 55-60571

[51] Int. Cl.$^3$ ............................................. H03R 13/02
[52] U.S. Cl. ................... 340/347 AD; 340/146.3 AG;
358/282; 307/358
[58] Field of Search ............. 340/347 AD, 146.3 AG;
307/358, 359; 358/282

[56] References Cited

U.S. PATENT DOCUMENTS 3,599,151  8/1971  Harr .......................... 340/146.3 AG
4,003,021  1/1977  Sasaki ....................... 340/146.3 AG
4,128,830 12/1978  Weythman .......................... 358/282

FOREIGN PATENT DOCUMENTS 50-81419 of 1975 Japan.
53-95518 of 1978 Japan.

Primary Examiner—C. D. Miller
Attorney, Agent, or Firm—Antonelli, Terry and Wands

[57]  ABSTRACT

A signal processing apparatus includes an updown counter for storing a maximum value of analog video signals produced from an array of photoelectric converting elements in a form of digital signal, and a distortion memory for storing a distortion characteristic of the analog video signal output from the photoelectric converting element. A reference voltage is produced on the basis of the output voltages from the up-down counter and the distortion memory to be compared with the analog video signal output from the photoelectric converting element array for encoding the analog video signal into a corresponding binary signal. The up-down counter is decremented with a periodical interval.

3 Claims, 3 Drawing Figures

SIGNAL PROCESSING APPARATUS

CROSS-REFERENCE OF RELATED APPLICATIONS

This application relates to U.S. patent application Ser. No. 260090 filed on the same day as the present application by MASAHARU TADAUCHI et al entitled "SCAN SIGNAL PROCESSING SYSTEM" assigned to the assignee of the present application, corresponding to Japanese patent application No. 55-60566 filed on May 9, 1980 and Japanese patent application No. 55-123593 filed on Sept. 8, 1980.

BACKGROUND OF THE INVENTION

The present invention relates in general to a signal processing apparatus. In particular, the invention concerns a signal processing apparatus which is preferentially suited for encoding an analog video signal into a binary signal, which analog video signal is obtained through photoelectric conversion of an original image by means of a photoelectric converting element array.

In facsimiles (Fax) and optical character reader systems (OCR), the analog video signal produced through the photoelectric conversion is encoded into a binary signal having a "white" level and a "black" level (or a ternary signal having additionaly a "gray" level). When an image of an original to be photoelectrically converted is illuminated by a light source having an elongated bar-like configuration and/or when the image is focussed through an optical lens system onto a light sensitive face of the photoelectric converting element array, there will frequently happen such a phenomenon in which a quantity of light tends to be insufficient at a peripheral portion of the image as compared with a mid portion thereof, involving eventually distortion in the analog video signal produced through the photoelectric conversion. This means that the encoding of such analog video signal into the binary signal with reference to a reference signal voltage of a predetermined magnitude will result in unreliability of the encoded binary information signal. As an attempt to evade such inconveniences, there has been already proposed a floating slice method according to which the reference signal voltage is caused to vary in following up the aforementioned distortions of the analog video signal by integrating the analog video signal to be encoded into the binary signal. However, the floating slice method is disadvantageous in that when a "gray" information continues to exist, the reference signal voltage is subjected to fluctuations in dependence on the characteristics of an integrating circuit as employed and the contents of the "gray" information, resulting in that the "gray" information is undesirably encoded into the "white" level information or alternatively into the "black" level information.

Further, there has been proposed a system in which the magnitude of the output signal from the photoelectric converting element array which corresponds to the "white" level of the original image is previously stored, whereby the analog video signal derived through the photoelectric conversion of the image is subsequently divided by the stored value thereby to correct the distortions of the analog video signal (refer to Japanese Laid-Open Patent Application Publication No. 95518/1978). However, this system naturally requires a rather complicated circuit configuration due to the necessity of a divider circuit for a high frequency on the one hand, while on the other hand, difficulty is encountered in correcting appropriately the analog video signal, when the background density of an original undergoes variations on the way of the scanning thereof.

It has been also proposed that the photoelectric conversion efficiencies of the individual photoelectric converting element constituting the photoelectric converting element array are previously stored, wherein the binary encoding is effected by comparing the analog video signal derived through the scanning and photoelectric conversion of an image with a reference signal voltage produced on the basis of the stored contents mentioned above (refer to Japanese laid-open patent application publication No. 81419/1975). However, this approach is also disadvantageous in that the binary encoding can not be accomplished with any reasonable accuracy because the reference voltage does not vary in following up possible variations in the background density of the original.

SUMMARY OF THE INVENTION

Accordingly, an object of the invention is to provide a signal processing apparatus which is cabable of encoding an analog video signal into a binary signal with an improved accuracy. More concretely, it is an object of the invention to provide a signal processing apparatus which is capable of encoding an analog video signal derived through photoelectric conversion of an original image with the aid of a photoelectric converting element array into a corresponding binary signal with a high accuracy and an enhanced reliability.

According to an aspect of the invention, there is proposed a signal processing apparatus for encoding an analog video signal produced through photoelectric conversion by scanning an image of an original into a binary signal, wherein reference signal generating means for producing a reference signal is provided which comprises a peak hold circuit for converting maximum values of the repeatedly incoming analog video signal into digital peak signals which are then stored and converting the stored digital peak signals into analog peak signals, a distortion storing circuit for previously storing a distortion characteristic signal of the analog video signal mentioned above, a reference voltage generating circuit for generating an analog reference signal voltage on the basis of the analog peak signal voltage supplied from the peak hold circuit and the distortion characteristic signal as read out from the distortion storing circuit, and a correcting circuit for periodically subtracting a predetermined quantity from the digital peak signal stored in the peak hold circuit.

According to the invention, the reference signal voltage is prepared on the basis of the distortion characteristic signal and the analog peak signal voltage and thus is not susceptible to the influence of information (image) density of the incoming analog video signal. Further, by virtue of such an arrangement that the digital peak signal stored in the peak hold circuit is periodically decremented during period between scanning lines, the reference signal voltage is caused to vary in following up variations in the background density of the original, involving an improved binary encoding operation performance for the analog video signal.

BRIEF DESCRIPTION OF THE DRAWINGS

An exemplary embodiment of the present invention is illustrated in the accompanying drawings, in which.

DETAILED DESCRIPTION OF THE PREFERRED EMBODIMENTS

Figure 1:
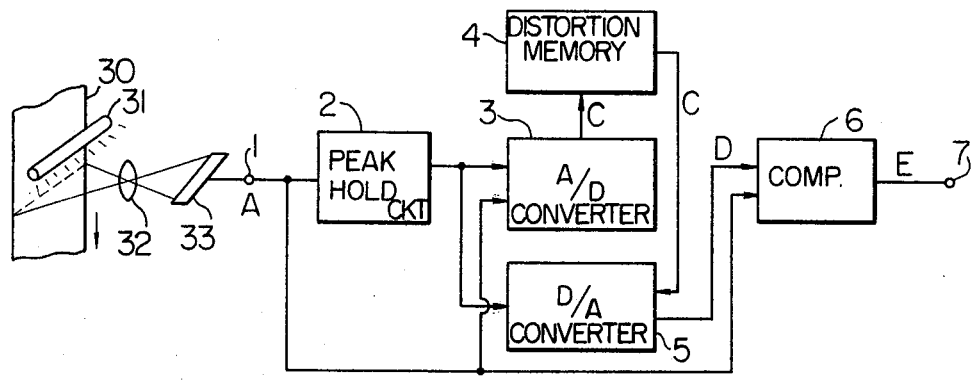
FIG. 1 is a block diagram showing a general arrangement of a signal processing apparatus according to the invention.

Referring to FIG. 1, an original 30 driven in the direction indicated by an arrow by means of driving means (not shown) is illuminated by a lamp 31, whereby an image of a scanning line region extending widthwise of the original (in a direction orthogonal to the driving direction) is focused through a lens 32 onto a light receiving face of a photoconductive element array 33. Electric signals produced by the individual photoconductive elements of the array 33 are successively output serially in the order in which the photoconductive elements are arrayed in the array 33 and supplied to an analog video input terminal 1 as an analog video signal A. Reference numeral 2 denotes a peak hold circuit for converting a maximum value of the incoming analog video signal A applied to the video input terminal 1 into a digital peak signal and storing the digital peak value therein. The peak hold circuit 2 produces an analog peak signal voltage B of a magnitude corresponding to the maximum value as stored. Reference numeral 3 denotes an analog-to-digital converter having imputs supplied with the analog video signal A and the analog peak signal voltage B and adapted to produce a digital distortion characteristic signal C shown in FIG. 3, which represents characteristically a ratio of deviation (characteristic distortion) of the analog video signal A with reference to the analog peak signal voltage B. The digital distortion characteristic signal C is then stored in a distortion memory 4. Reference numeral 5 denotes a digital-analog converter which is adapted to receive as inputs thereto the distortion characteristic signal C read out from the distortion memory 4 and the analog peak signal voltage B supplied from the peak hold circuit 2. The digital-to-analoge converter 5 then produces as the output signal an analog reference signal voltage D shown in FIG. 3, which was formed by modifying the digital distortion characteristic signal D in accordance with the analog peak signal B. Reference numeral 6 denotes a comparator circuit for comparing the analog video signal A with the reference signal voltage D to produce a binary encoded information signal E at an encoded information output signal 7. It should be mentioned here that operations of the analog-to-digital converter 3, the memory 4 and the digital-to-analog converter 5 are controlled for all the picture elements on a single scanning line by a synchronizing signal.

Figure 2:
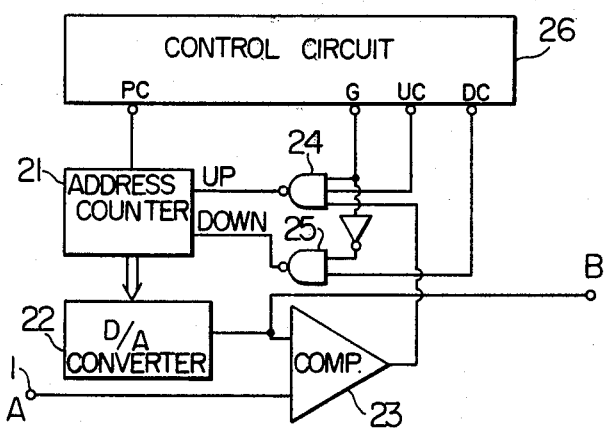
FIG. 2 is a block diagram of a peak hold circuit used in the signal processing apparatus shown in FIG. 1.

FIG. 2 shows an exemplary embodiment of the peak hold circuit 2 described above. Reference numeral 21 denotes an address counter (an up-down counter), 22 denotes a digital-to-analog converter, 23 denotes a comparator, 24 and 25 denote NAND gates, and 26 denotes a control circuit for controlling the address counter 21. With the arrangement of the peak hold circuit 2 as illustrated, when a pre-clear signal PC from the address counter 21 is released or becomes low "L" level, resulting in that an up-clock (incrementing clock) signal UC is applied from the control circuit 26 in response to a gate signal G of high "H" level to the address counter 21 through the gate 24. The address counter 21 counts up the up-clock signal UC and the content thereof is applied to the comparator 23 through the D/A converter 22. The output of the comparator 23 is at "H" level until the maximum value of the analog video signal A has coincided with the output signal from the digital-to-analog converter 22, whereby the up-clock signal UC is supplied to the input of the address counter 21 through the NAND gate 24 until the output of the comparator 23 becomes low "L" level thereby to stop the application of the signal UC to the counter 21. As a consequence, a maximum value of the analog video signal A is stored in the address counter 21 in a form of the digital signal. When a down-clock (decrementing clock) signal DC is produced in response to the falling edge of the gate signal G (i.e. low "L" level) during a quiescent time of the analog video signal A, the down-clock signal DC is applied to the input of the address counter 21 by way of the NAND gate 25, whereby the contents in the address counter 21 is decremented.

Figure 3:
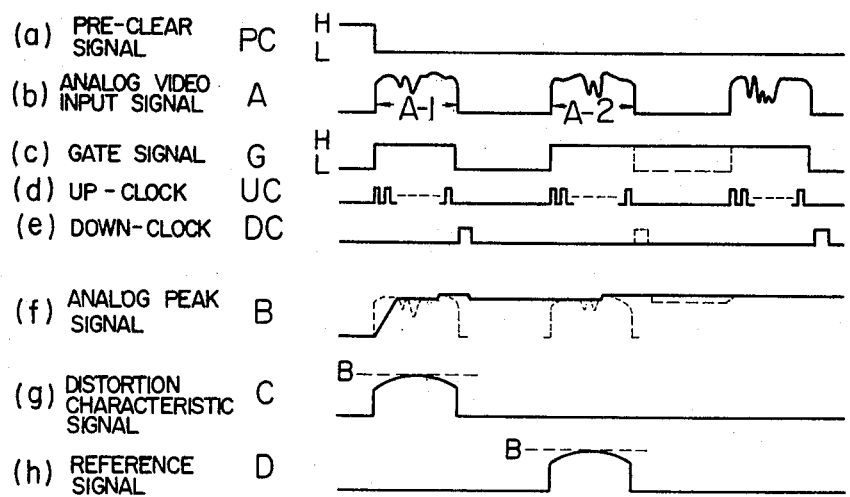
FIG. 3 shows signal waveforms for illustrating operation of the apparatus.

In the following, description will be made on overall operations by referring to a signal timing diagram shown in FIG. 3. When the pre-clear signal PC is at "L" level with the gate signal G being at "H" level during a period in which the analog video input signal A-1 corresponding to the outputs of the array 33 of one scanning line makes appearance, the contents of the address counter 21 are successively incremented until the output of the D/A converter 22, i.e. the signal B, has coincided with the maximum value of the analog video signal A-1 and holds the incremented contents. During the quiescent interval of the analog video signal A, the gate signal G is at the "L" level with the single down-clock DC being applied to the input of the address counter 21, whereby the latter is decremented by one unit. The value of contents at that time is converted through the digital-to-analog converter 22 into the corresponding analog peak signal voltage B. In this manner, the incoming analog video signal A-2 for the succeeding scanning cycle can be compared with the analog reference signal voltage D prepared by the analog peak signal voltage B and the distortion characteristic signal C read out from the distortion memory 4 to thereby be encoded into a corresponding binary signal. During the period in which the analog video signal A-2 makes appearance, the gate signal G takes again the high or "H" level, as the result of which the contents of the counter 21 will be again incremented to update correctively the stored value to be coincide with the maximum value of the analog video signal A-2, when the maximum value of the analog video signal A-2 becomes greater than the peak signal voltage stored until then. Since the stored value is simply repeatedly decremented or subtracted, for example, for each quiescent interval of the analog video signal A corresponding to one scanning line in the case where the background density of the original is increased, the analog peak signal voltage B is decreased to a value which corresponds to the background density. In other words, the analog peak hold signal voltage B derived from the peak hold circuit 2 can follow changes or variations in the background density of the original. Thus, the peak value of the analog reference signal voltage D changes in accordance with the peak hold signal voltage B. As the consequence, the analog reference signal voltage D prepared on the basis of the peak hold signal voltage B and the distortion characteristic signal C can also follow the variations in the background density of the original, to thereby allow the analog video signal A to be encoded into a corresponding binary signal with a high accuracy.

In the foregoing description, it has been assumed that the single down-clock DC is input during the quiscent interval of the analog video signal A. However, it should be appreciated that the number of the input down-clock DC for each of the quiscent interval can be altered in accordance with the degree of changes in the background density of the original. Further, it is not necessary that all the down clocks DC be input during each of the quiscent interval, but the down clocks DC may be input for every at least two quiscent intervals.

As will be appreciated from the foregoing description, by virtue of the arrangement according to the invention such that the reference signal voltage is prepared on the basis of the peak signal stored as the digital signal and the distortion characteristic signal, the reference signal voltage is insusceptible to influences of the image density components of the analog video signal, while the latter can be encoded into a binary signal with an improved accuracy because the peak signal can be controlled so as to follow up variations in the density of the original image.

We claim:

1. A signal processing apparatus for encoding analog video signals produced for every photoelectric conversion effected through scanning an image of an original into a binary signal by comparing said analog video signal with a reference signal voltage, wherein reference signal voltage generating means for producing said reference signal voltage comprises a peak hold circuit adapted to convert a maximum value of a repeatedly incoming analog video signal into a digital signal, store said digital signal as a digital peak signal and convert said digital peak signal into an analog peak signal, a distortion storing circuit for storing previously a distortion characteristic signal, a reference voltage generating circuit adapted for producing an analog reference signal voltage on the basis of an analog peak signal voltage produced from said peak hold circuit and said distortion signal read out from said distortion storing circuit, and a correcting circuit for subtracting periodically a predetermined quantity from said digital peak signal stored in said peak hold circuit.

2. A signal processing apparatus as set forth in claim 1, wherein said peak hold circuit comprises an up-down counter, a digital-to-analog counter for converting storage contents of said up-down counter into an analog voltage, a comparator for comparing said analog video signal with the magnitude of the output signal from said digital-to-analog converter, and a gate circuit enabled by an output signal produced from said comparator to supply a clock to an up-input of said up-down counter when the output signal voltage from said digital-to-analog converter is smaller than the voltage of said analog video signal.

3. A signal processing apparatus as set forth in claim 1, wherein said correcting circuit is adapted to pulses for subtracting a predetermined quantity from the digital peak signal stored in said peak hold circuit during interval between repeated incoming analog video signals each corresponding to a single scanning line.

* * * * *